US012018755B2

United States Patent
Tsukui et al.

(10) Patent No.: US 12,018,755 B2
(45) Date of Patent: Jun. 25, 2024

(54) SEAL STRUCTURE OF COLD STORAGE AND COLD STORAGE

(71) Applicant: PHC Corporation, Ehime (JP)

(72) Inventors: Nobuyuki Tsukui, Gunma (JP); Eiichi Mori, Ehime (JP); Eiji Doi, Ehime (JP)

(73) Assignee: PHC CORPORATION, Ehime (JP)

( * ) Notice: Subject to any disclaimer, the term of this patent is extended or adjusted under 35 U.S.C. 154(b) by 248 days.

(21) Appl. No.: 17/674,253

(22) Filed: Feb. 17, 2022

(65) Prior Publication Data
US 2022/0170548 A1    Jun. 2, 2022

Related U.S. Application Data

(63) Continuation of application No. PCT/JP2020/030914, filed on Aug. 14, 2020.

(30) Foreign Application Priority Data

Aug. 27, 2019 (JP) ................................. 2019-154911

(51) Int. Cl.
 *F16J 15/02* (2006.01)
 *F25D 23/02* (2006.01)

(52) U.S. Cl.
 CPC .......... *F16J 15/022* (2013.01); *F25D 23/028* (2013.01)

(58) Field of Classification Search
 CPC ..... F16J 15/022; F25D 23/028; F25D 23/021; F25D 23/087
 See application file for complete search history.

(56) References Cited

U.S. PATENT DOCUMENTS

| | | | | |
|---|---|---|---|---|
| 2,659,115 | A | * | 11/1953 | Anderson ............. E05C 19/161 49/478.1 |
| 5,309,680 | A | * | 5/1994 | Kiel ...................... F25D 23/082 49/478.1 |
| 6,227,634 | B1 | * | 5/2001 | Cittadini ............... F25D 23/087 49/478.1 |

(Continued)

FOREIGN PATENT DOCUMENTS

| CN | 2454732 Y | 10/2001 |
|---|---|---|
| CN | 202947409 U * | 5/2013 |

(Continued)

OTHER PUBLICATIONS

Extended European Search Report dated Aug. 5, 2022 issued in the corresponding European Patent Application No. 20857828.6.

(Continued)

*Primary Examiner* — Hanh V Tran
(74) *Attorney, Agent, or Firm* — Rimon P.C.

(57) ABSTRACT

This seal structure of a cold storage comprises: a long member that has a magnetic portion configured from a magnetic material; and packing having a magnet that attracts and is attracted by the magnetic portion, a holding portion that holds the magnet, and a sealing portion that comes into close contact with the long member at a position further inward or outward of a cooling chamber than the holding portion when the cooling chamber is sealed, the packing increasing the distance between one portion of the magnet and the long member prior to increasing the distance between the other portion of the magnet and the long member during separation from the long member.

8 Claims, 5 Drawing Sheets

(56) References Cited

U.S. PATENT DOCUMENTS

| | | | | |
|---|---|---|---|---|
| 10,563,905 | B1* | 2/2020 | Allard | F25D 23/028 |
| 10,788,258 | B2* | 9/2020 | Johnson | E06B 7/2309 |
| 11,085,692 | B2* | 8/2021 | Okazaki | E05C 19/161 |
| 11,319,748 | B2* | 5/2022 | Raab | E06B 7/2309 |
| 11,543,067 | B2* | 1/2023 | Ki | F16L 59/065 |
| 2005/0189726 | A1* | 9/2005 | Shin | F25D 23/087 |
| | | | | 277/628 |
| 2009/0277096 | A1* | 11/2009 | Ramos | F25D 23/087 |
| | | | | 49/478.1 |
| 2018/0073800 | A1* | 3/2018 | Okazaki | F25D 23/08 |
| 2018/0259244 | A1* | 9/2018 | Kim | F25D 23/087 |

FOREIGN PATENT DOCUMENTS

| | | | | |
|---|---|---|---|---|
| CN | 104515346 A | * | 4/2015 | |
| CN | 104534792 A | | 4/2015 | |
| CN | 104976851 A | * | 10/2015 | |
| CN | 105466125 A | * | 4/2016 | |
| CN | 105783396 A | * | 7/2016 | |
| CN | 205425597 U | * | 8/2016 | |
| CN | 106766587 A | * | 5/2017 | |
| CN | 107782052 A | * | 3/2018 | |
| CN | 207147041 U | * | 3/2018 | |
| CN | 207963286 U | * | 10/2018 | |
| CN | 110397375 A | * | 11/2019 | |
| CN | 112460888 A | * | 3/2021 | F25D 11/00 |
| DE | 20280427 U1 | * | 12/2004 | F25D 23/087 |
| DE | 202015107071 U1 | * | 5/2017 | F25D 23/087 |
| DE | 202016106532 U1 | * | 4/2018 | F25D 23/087 |
| DE | 102017214239 A1 | * | 2/2019 | E06B 7/2309 |
| DE | 202018105686 U1 | * | 2/2020 | F25D 23/087 |
| EP | 3181790 A1 | * | 6/2017 | |
| JP | 46-017423 Y | | 6/1971 | |
| JP | 50-147960 U | | 12/1975 | |
| JP | H03-087460 U | | 9/1991 | |
| JP | H0686296 U | * | 12/1994 | |
| JP | H11276316 A | * | 10/1999 | |
| JP | 2002-098233 A | | 4/2002 | |
| JP | 2018040541 A | * | 3/2018 | F25D 11/00 |
| JP | 6521665 B2 | | 5/2019 | |
| JP | 2020193737 A | * | 12/2020 | |
| WO | WO-2004105558 A1 | * | 12/2004 | A47F 3/0434 |
| WO | WO-2011142128 A1 | * | 11/2011 | F25D 23/087 |
| WO | WO-2017045368 A1 | * | 3/2017 | F25D 23/02 |

OTHER PUBLICATIONS

International Search Report and Written Opinion issued in International Patent Application No. PCT/JP2020/030914, dated Oct. 20, 2020; with partial English translation.

* cited by examiner

SEAL STRUCTURE OF COLD STORAGE AND COLD STORAGE

CROSS-REFERENCE OF RELATED APPLICATIONS

This application is a Continuation of International Patent Application No. PCT/JP2020/030914, filed on Aug. 14, 2020, which in turn claims the benefit of Japanese Application No. 2019-154911, filed on Aug. 27, 2019, the entire disclosures of which Applications are incorporated by reference herein.

TECHNICAL FIELD

The present disclosure relates to a sealing structure of a refrigerator and a refrigerator.

BACKGROUND ART

PTL 1 discloses a refrigerating showcase as a cold storage apparatus that stores an object under a low temperature environment, for example. The refrigerating showcase disclosed in PTL 1 includes a glass door including a magnet packing that holds a magnet, and a main body frame member on which a plate composed of a magnetic member is attached, and the slide door is sealed when the magnet is attracted and attached to the plate.

CITATION LIST

Patent Literature

PTL 1

Japanese Patent Application Laid-Open No. 2002-98233

SUMMARY OF INVENTION

Technical Problem

However, the magnet packing of PTL 1 is insufficient in terms of its function. Therefore, improvement in function of the sealing structure of cold storage apparatuses is desired.

In view of this, an object of the present disclosure is to provide a sealing structure of a refrigerator with a higher function and a refrigerator including the sealing structure.

Solution to Problem

A sealing structure of a refrigerator according to the present disclosure includes: an elongated member including a magnetic part including a magnetic material; a magnet configured to be mutually attracted with the magnetic part; and a packing including a holding part configured to hold the magnet, and a sealing part configured to make intimate contact with the elongated member on inside or outside of a refrigeration compartment than the holding part when the refrigeration compartment is sealed. When the packing is being separated from the elongated member, a distance between another part of the magnet and the elongated member becomes larger at an earlier timing than a distance between a part of the magnet and the elongated member.

A refrigerator according to the present disclosure includes the above-described sealing structure of the refrigerator.

Advantageous Effects of Invention

According to the present disclosure, it is possible to provide a sealing structure of a refrigerator with a higher function and a refrigerator including the sealing structure.

DESCRIPTION OF EMBODIMENTS

An embodiment of the present disclosure is elaborated below with reference to the accompanying drawings. Note that the embodiment described below is merely an example, and the present disclosure is not limited to the embodiment.

Figure 1:
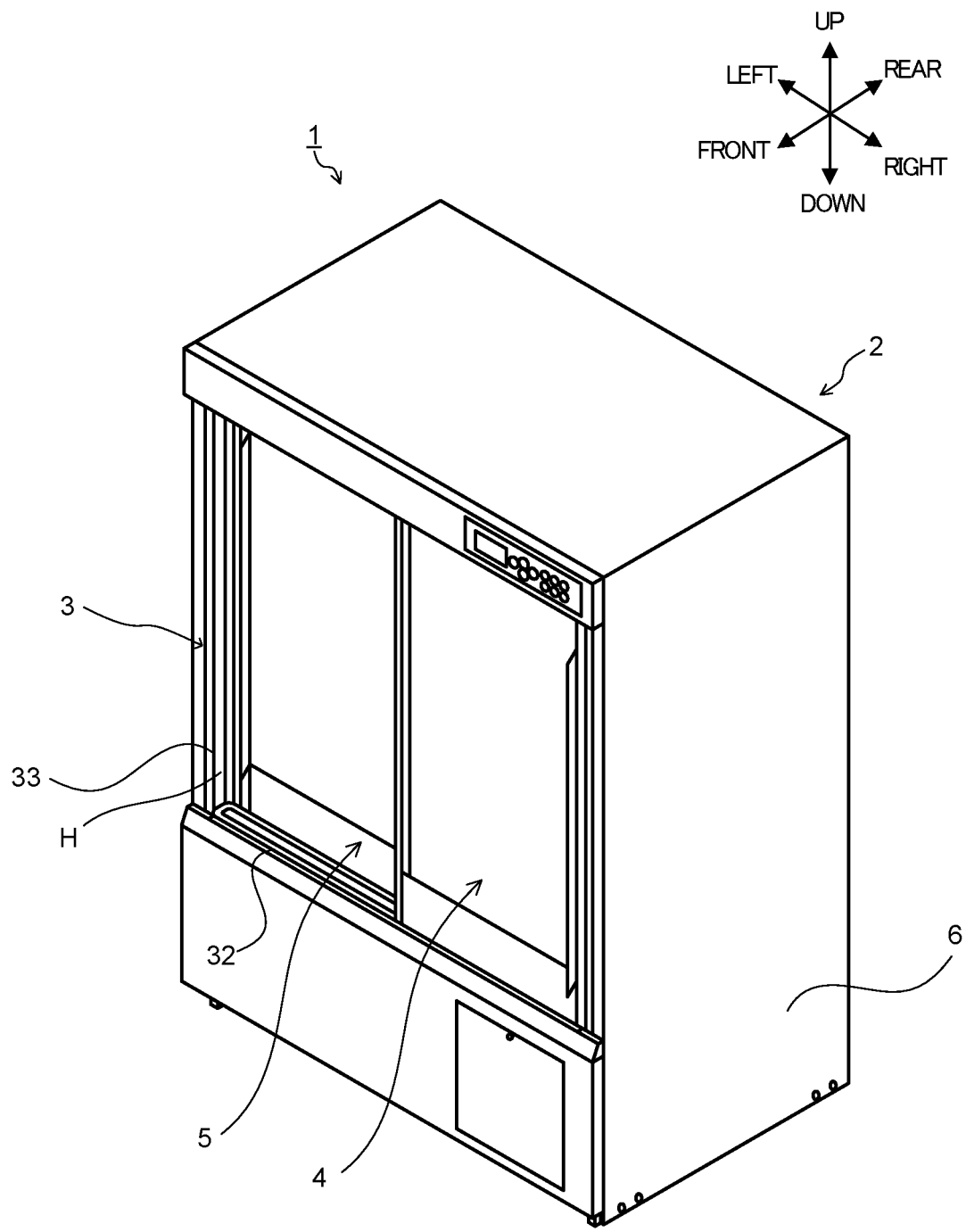
FIG. 1 is a perspective view of a refrigerator according to the present disclosure.
Figure 2:
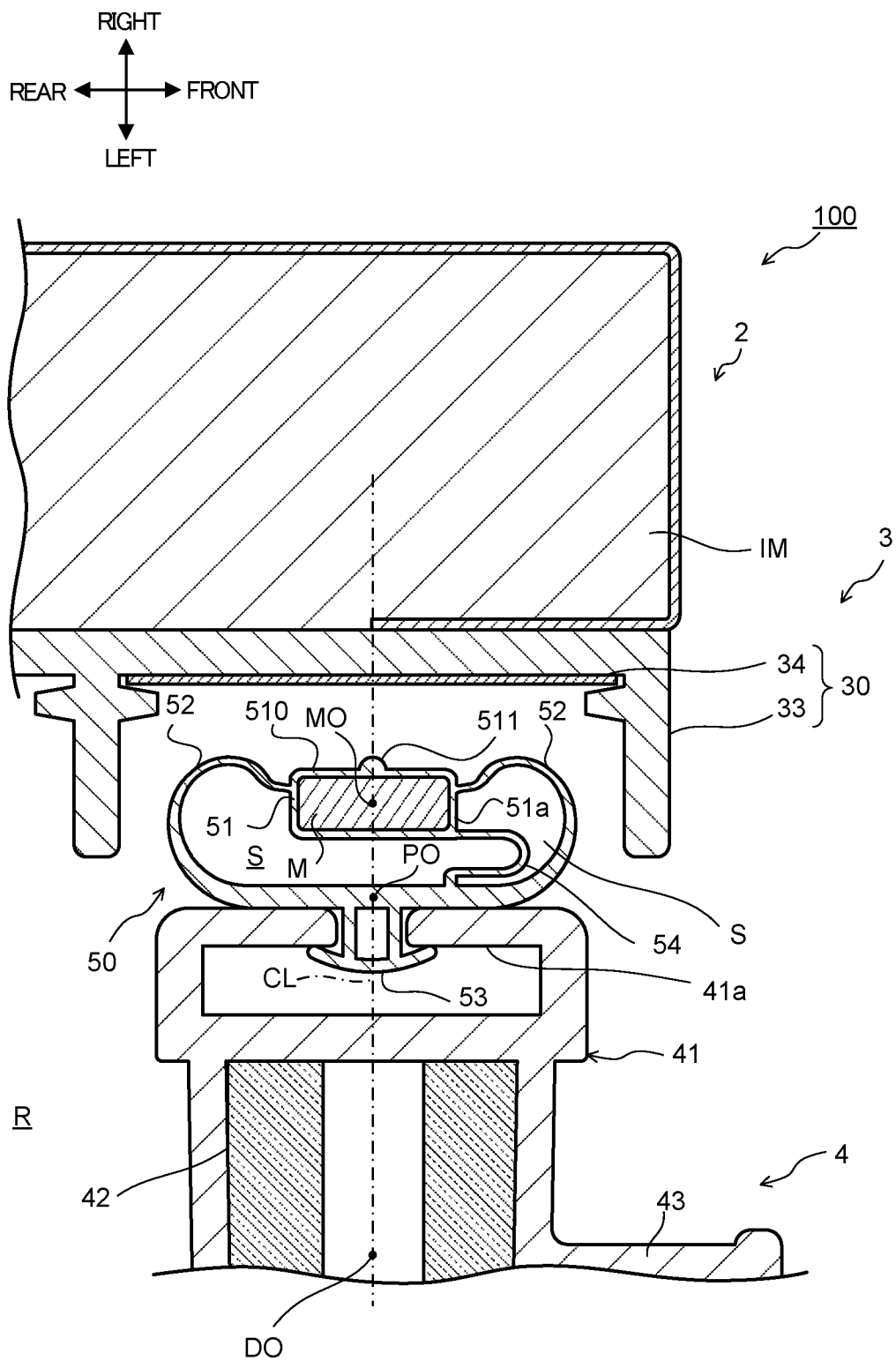
FIG. 2 is a cross-sectional view illustrating a sealing structure of the refrigerator according to the present disclosure, in a state where a packing is not in contact with an elongated member.

First, a configuration of refrigerator 1 is described with reference to FIGS. 1 and 2. FIG. 1 is a perspective view of refrigerator 1 according to the present disclosure. FIG. 1 illustrates a state where sliding doors 4 and 5 described later are at a fully closed position. FIG. 2 is a cross-sectional view illustrating sealing structure 100 of the refrigerator according to the present disclosure, and illustrates a state where packing 50 described later is not in contact with elongated member 30. Here, the cross section is a cross-section taken along a plane along the thickness direction of sliding door 4 described later and the opening closing direction of sliding door 4, i.e., the horizontal plane. Note that refrigerator 1 of the present embodiment is, for example, a medicine refrigerator for storing pharmaceutical drugs. In addition, in the present specification, the side facing the user using it (the side on which sliding doors 4 and 5 are provided) is the front side of refrigerator 1, and the side opposite to the front side is the rear side of refrigerator 1. In addition, the left side and the right side as viewed from the front side are the left side and the right side of refrigerator 1.

Refrigerator 1 includes housing 2, frame body 3, sliding doors 4 and 5, and machine housing compartment 6.

Opening H is formed in the front surface of housing 2. Heat insulation material IM is provided between the outer peripheral surface and the inner peripheral surface of housing 2. The space surrounded by the inner peripheral surface of housing 2 is refrigeration compartment R, which is a space for housing an object.

Frame body 3 is provided in housing 2 to surround opening H. Frame body 3 includes an upper frame (not illustrated in the drawing), lower frame 32, and vertical frame 33. In the upper frame and lower frame 32, a front rail and a rear rail (not illustrated in the drawing) where sliding doors 4 and 5 are disposed are provided. Plate member 34 is disposed in vertical frame 33 on the side that faces sliding door 4. Plate member 34 is a magnetic part includes a magnetic material. Note that plate member 34 may be embedded in vertical frame 33, or may be disposed between vertical frame 33 and housing 2. In addition, vertical frame 33 may include a magnetic part with a shape different from plate member 34. In the present embodiment, vertical frame 33 and plate member 34 make up elongated member 30. Note that vertical frame 33 itself may be a magnetic part includes a magnetic material. In this case, vertical frame 33 is elongated member 30.

Sliding doors 4 and 5 can move on the front rail and the rear rail in the horizontal direction. Sliding door 4 and sliding door 5 have the same configurations, and therefore the configuration of sliding door 4 is described below, and, the description of sliding door 5 is omitted. Note that the opening direction and the closing direction of sliding door 4 correspond to the left direction and the right direction, respectively, and the opening direction and the closing direction of sliding door 5 correspond to the right direction and the left direction, respectively.

As illustrated in FIG. 2, sliding door 4 includes sash 41, glass layer 42, and handle 43. Sash 41 includes attached part 41a in a surface that faces plate member 34, on the closing direction side of sliding door 4. Packing 50 holding magnet M is attached to attached part 41a.

Glass layer 42 is fit in sash 41. Glass layer 42 includes a plurality pieces of transparent glass. Handle 43 is a portion that is grabbed by the user of refrigerator 1 to open and close sliding door 4.

Machine housing compartment 6 is provided at the lower portion of housing 2. The internal space of machine housing compartment 6 is a machine compartment. In the machine compartment, a compressor and a condenser that make up a refrigeration circuit for cooling the inside of refrigeration compartment R and the like are disposed.

Figure 3:
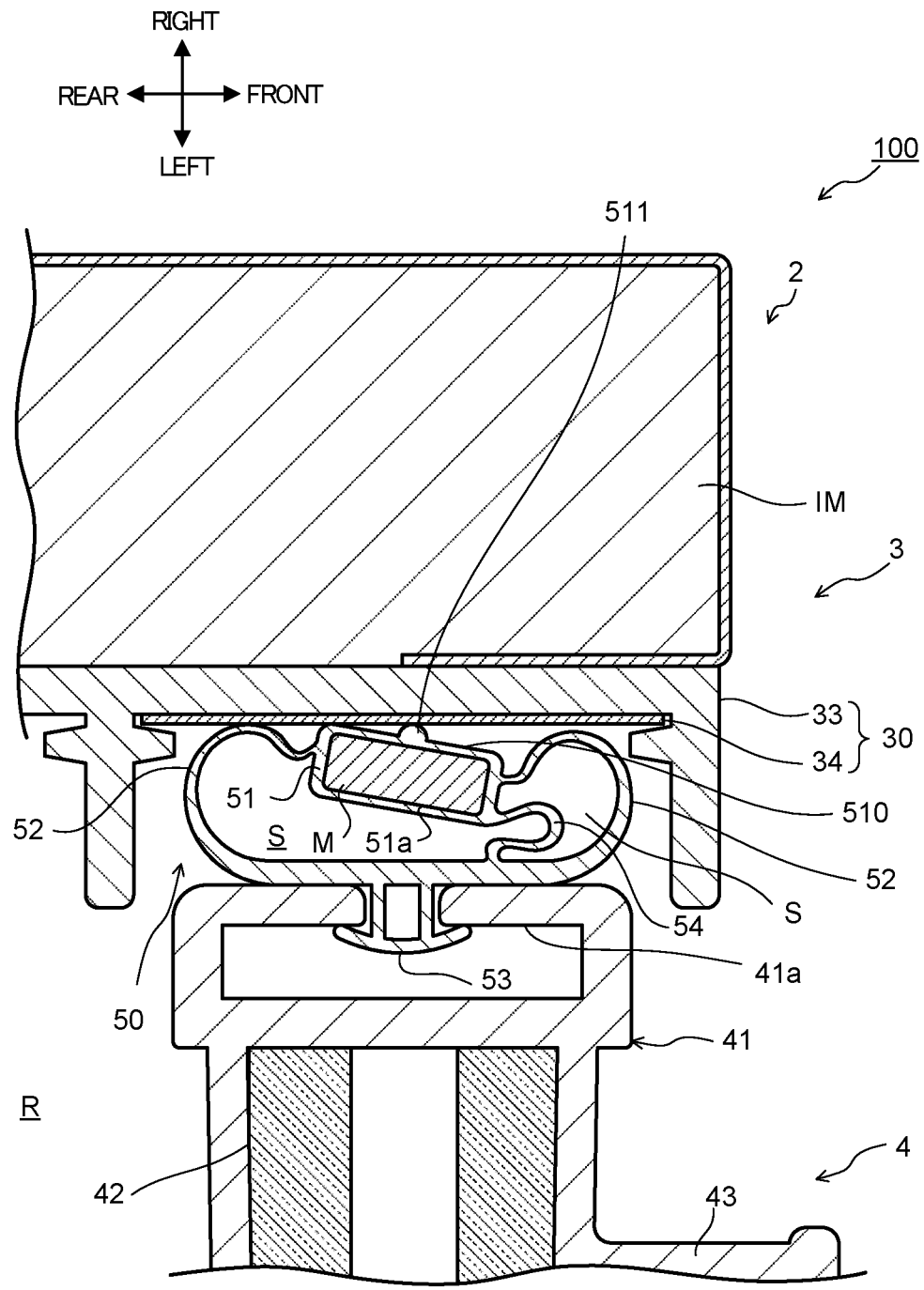
FIG. 3 is a cross-sectional view illustrating the sealing structure of the refrigerator according to the present disclosure, in a state where the packing is in intimate contact with the elongated member.

Next, sealing structure 100 of the refrigerator is described with reference to FIGS. 2 and 3. FIG. 3 is a cross-sectional view illustrating sealing structure 100 of refrigerator 1 according to the present disclosure in a state where packing 50 is in intimate contact with elongated member 30. Sealing structure 100 includes elongated member 30, packing 50, and magnet M.

Packing 50 includes a soft resin material.

Packing 50 is vertically extended from the upper end to the lower end of sliding door 4. The cross-sectional shape of packing 50 taken along the horizontal plane is equal regardless of the position. As illustrated in FIG. 2, the shape of packing 50 is asymmetric in the front-rear direction with the center in the front-rear direction therebetween. In the following description, the inside of refrigeration compartment R is simply referred to as "inside", and the outside of refrigeration compartment R is simply referred to as "outside".

Packing 50, including magnet M, is disposed such that in the front-rear direction, the center in the front-rear direction coincides with the center of sliding door 4 in the front-rear direction. In other words, point MO, which is the center of magnet M, and point PO, which is the center of packing 50, in the front-rear direction (i.e., thickness direction) of sliding door 4 are located on line CL, which is parallel to the opening closing direction of sliding door 4 and passes through DO point that is the center of sliding door 4 in the front-rear direction of sliding door 4. In this manner, even when the size of packing 50 in the front-rear direction is greater than the size of sliding door 4 in the front-rear direction, the length of the portion of packing 50 protruding in the front-rear direction toward sliding door 4 can be minimized Specifically, packing 50 does not excessively protrude in the front-rear direction with respect to sliding door 4. This makes it easy to perform the operation of attaching, to frame body 3, sliding door 4 on which packing 50 is attached.

Note that even in the case where it is necessary to increase the size of packing 50 in the front-rear direction to a certain degree to increase the sealing property and the heat insulating property (these effects are described later) of packing 50, the protruding amount of packing 50 to sliding door 4 in the front-rear direction can be set to a small value by only positioning the center (point MO) of magnet M on line CL.

Packing 50 includes holding part 51, sealing part 52, attaching part 53, and connecting part 54.

Insertion space 51a is formed in holding part 51. Magnet M is inserted in insertion space 51a. Holding part 51 holds magnet M by sandwiching magnet M by the inner peripheral surface of holding part 51. Magnet M is vertically extended from the upper end to the lower end of packing 50. Magnet M and plate member 34 attract each other.

Holding part 51 includes vertical frame side portion 510 located between magnet M and plate member 34. Vertical frame side portion 510 makes intimate contact with plate member 34 when sliding door 4 is at the fully closed position. Vertical frame side portion 510 includes protrusion 511 at its center portion. Protrusion 511 is vertically extended from the upper end to the lower end of packing 50.

When sliding door 4 is at the fully closed position, i.e., when refrigeration compartment R is sealed, protrusion 511 makes intimate contact with plate member 34. In addition, holding part 51 is tilted in any of the directions around the vertical axis. As a result, the inner end part or the outer end part of vertical frame side portion 510 makes intimate contact with plate member 34, together with protrusion 511. FIG. 3 illustrates a state where the inner end part of holding part 51 is in intimate contact with plate member 34.

When sliding door 4 is at the fully closed position, magnet M is tilted together with holding part 51, and consequently there is a difference between the distance from the portion of magnet M on the outside to plate member 34 and the distance from the portion of magnet M on the inside to plate member 34. Therefore, in the state illustrated in FIG. 3, the attractive force that acts on the portion of magnet M on the outside from plate member 34 is smaller than the attractive force that acts on the portion of magnet M on the inside from plate member 34.

Sealing part 52 is located on the outside and the inside than holding part 51 and connecting part 54. Sealing part 52 located on the outside is connected to holding part 51 and attaching part 53 on the outside. Sealing part 52 located on the inside is connected to holding part 51 and attaching part 53 on the inside. Note that packing 50 may include only one of sealing part 52 on the outside and sealing part 52 on the inside.

When sliding door 4 is at the fully closed position, holding part 51 is tilted, and therefore one of sealing part 52 on the inside and sealing part 52 on the outside protrudes, and the other recesses. Thus, one of sealing part 52 on the inside and sealing part 52 on the outside strongly makes intimate contact with plate member 34. FIG. 3 illustrates a state where sealing part 52 located on the inside is in intimate contact with plate member 34.

Attaching part 53 is a portion attached to sash 41 of sliding door 4, which is an attaching object.

Connecting part 54 is provided between magnet M and attaching part 53. Connecting part 54 connects the portions on the outside of holding part 51 and attaching part 53. Since connecting part 54 connects holding part 51 and attaching part 53 in the above-described manner, two heat insulating spaces S are formed in packing 50. Connecting part 54 has a deflected shape. The cross-sectional shape of connecting part 54 taken along the horizontal plane is a U-shape protruding outward.

Figure 4A:
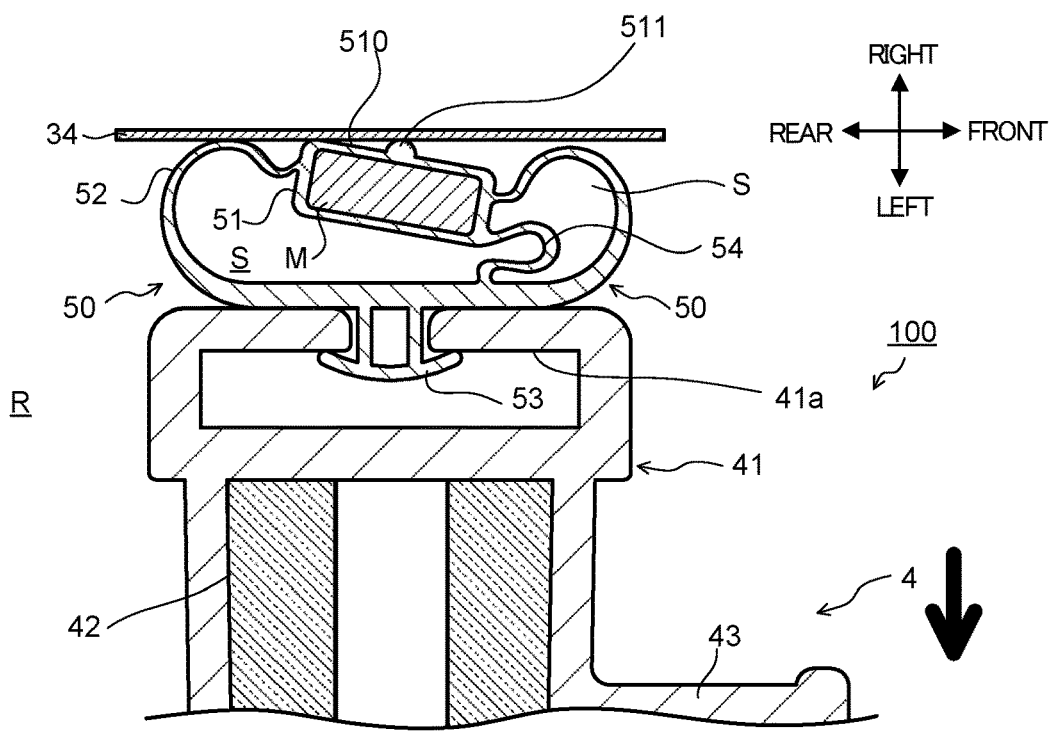
FIG. 4A is a cross-sectional view of the packing according to the present disclosure, in a state before a force in the opening direction is exerted on a sliding door of the refrigerator.
Figure 4B:
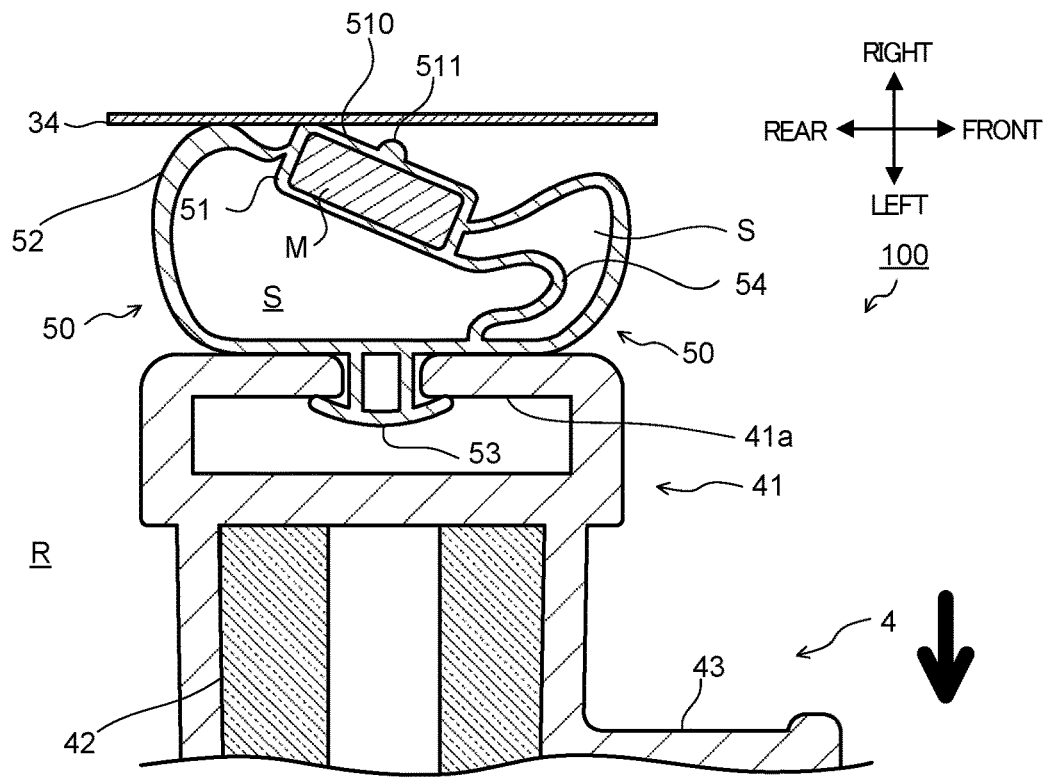
FIG. 4B is a cross-sectional view of the packing according to the present disclosure, in a state after the force in the opening direction is exerted on the sliding door of the refrigerator.

Next, an operation of sealing structure 100 of the refrigerator is described with reference to FIGS. 2, 4A and 4B. FIG. 4A is a cross-sectional view of packing 50 in a state before a force in the opening direction is exerted on sliding door 4. FIG. 4B is a cross-sectional view of packing 50 according to the present disclosure in a state after a force in the opening direction is exerted on sliding door 4.

As illustrated in FIG. 4A, when sliding door 4 is located at the fully closed position, packing 50 is in intimate contact with plate member 34. With magnet M of sliding door 4 and plate member 34 attracted each other, sliding door 4 is held at the fully closed position.

As with holding part 51, magnet M is tilted with respect to plate member 34, and in FIG. 4A, the inner end part of vertical frame side portion 510 and sealing part 52 on the inside are in intimate contact with plate member 34.

When the user of refrigerator 1 grabs handle 43 and applies a force in the direction indicated with the thick arrow in FIG. 4A, i.e., the opening direction, sliding door 4 moves in the opening direction. As sliding door 4 moves, attaching part 53 of packing 50 is pulled in the opening direction by attached part 41a of sash 41.

When attaching part 53 is pulled, sealing part 52 and connecting part 54 of packing 50 are elastically deformed and stretched in the horizontal direction while maintaining the attraction between magnet M and plate member 34. As a result, the distance between holding part 51 and attaching part 53 is increased.

When sealing part 52 and connecting part 54 are elastically deformed, the portion of holding part 51 on the outside is pulled by connecting part 54 in the opening direction. That is, the force in the opening direction of connecting part 54 acts on the portion of holding part 51 on the outside. On the other hand, the force in the opening direction of connecting part 54 does not act on the portion of holding part 51 on the inside.

In this manner, when there is a difference between the values of the force in the opening direction that acts on the portion of holding part 51 on the outside and the force in the opening direction that acts on the inside of holding part 51, the distance between the portion of magnet M on the outside and plate member 34 is increased at a timing earlier than the distance between the portion of magnet M on the inside and plate member 34. That is, magnet M is more tilted with respect to plate member 34 in comparison with the state where sliding door 4 is located at the fully closed position.

When sliding door 4 further moves in the opening direction, the portion of holding part 51 on the outside is further pulled in the opening direction by connecting part 54. In addition, as sliding door 4 moves, sealing part 52 is also pulled in the opening direction by attaching part 53. In this manner, the inner end part of vertical frame side portion 510, and sealing part 52 on the inside move away from plate member 34. Specifically, refrigeration compartment R is changed from the sealed state to the open state. When refrigeration compartment R is brought into an open state, packing 50 is returned to a natural state from an elastically deformed state as illustrated in FIG. 2.

Note that when the outer end part of holding part 51 makes intimate contact with plate member 34 unlike the case exemplified in FIG. 3, packing 50 behaves as described below when sliding door 4 is opened. Specifically, when the portion of holding part 51 on the outside is pulled in the opening direction by connecting part 54, holding part 51 and magnet M rotate like a seesaw with protrusion 511 as a fulcrum, and a state substantially similar to the state illustrated in FIG. 3 is set. The behavior after this operation is the same as the behavior described above.

Specifically, even when one of the portion on the inside and the portion on the outside of magnet M is tilted and brought closer to plate member 34 when sliding door 4 is at the fully closed position, the distance from the portion of magnet M on the outside to plate member 34 is increased at an earlier timing than the distance from the portion of magnet M on the inside to plate member 34.

Note that connecting part 54 may connect the portions on the inside of holding part 51 and attaching part 53. In this case, when sliding door 4 moves in the opening direction, the force in the opening direction acts on the portion of holding part 51 on the inside due to connecting part 54, and as a result the distance between the portion of magnet M on the inside and plate member 34 is increased at an earlier timing than the distance between the portion of magnet M on the outside and plate member 34.

As described above, according to the present embodiment, packing 50 is formed to have a cross-sectional shape that is asymmetrical between the inside of refrigeration compartment R and the outside of refrigeration compartment R. As a result, when sliding door 4 at the fully closed position moves in the opening direction, there is a difference between the values of the forces in the opening direction that act on the portion on the outside and the portion of holding part 51 on the inside. As a result, one of the distance from the portion of magnet M on the inside to plate member 34 and the distance from the portion of magnet M on the outside to plate member 34 is increased at an earlier timing than the other. That is, the attraction between magnet M and plate member 34 is weakened first from the outside or the inside. Thus, sliding door 4 can be moved in the opening direction from the fully closed state with a smaller force. In addition, when sliding door 4 is at the fully closed position, not only vertical frame side portion 510 of holding part 51, but also sealing part 52 is in intimate contact with plate member 34. Thus, intimate contact portions of packing 50 with plate member 34 can be increased, and the sealing property of refrigeration compartment R can be increased.

According to the present embodiment, the center (point MO) of magnet M in the thickness direction (front-rear direction) of sliding door 4 is located on line CL that passes through the center (point DO) of sliding door 4 in the thickness direction of sliding door 4 and is parallel to the front-rear direction of sliding door 4, packing 50 does not excessively protrude in the front-rear direction with respect to sliding door 4. Thus, it is easy to perform the operation of attaching sliding door 4 on which packing 50 is attached, to frame body 3. In addition, according to the present embodiment, vertical frame 33 need not have a long size in the front-rear direction, and thus the depth size of refrigerator 1 can be reduced.

Since connecting part 54 connects holding part 51 and attaching part 53, a plurality of heat insulating spaces S are formed in packing 50. Therefore, in comparison with the case where packing 50 does not include connecting part 54, i.e., the case where only one heat insulating space S is provided, the heat insulating property of refrigeration compartment R is higher.

Vertical frame side portion 510 includes protrusion 511, and therefore when sliding door 4 is at the fully closed position, magnet M is not parallel to plate member 34, but is in a tilted state. That is, when sliding door 4 is at the fully closed position, there is a difference between the attractive force that acts on a portion of magnet M from plate member 34, and the attractive force that acts on another portion of magnet M from plate member 34. Thus, in comparison with the case where packing 50 does not include protrusion 511, sliding door 4 can be moved in the opening direction from the fully closed position with a further smaller force.

Since connecting part 54 of the present embodiment has a deflected shape, packing 50 readily extends in the opening closing direction of sliding door 4. Thus, the upper end portion and lower end portion of connecting part 54 may extend in different lengths. Thus, even when sliding door 4 at the fully closed position is tilted around the axis parallel to the thickness direction of sliding door 4, packing 50 from the upper end to the lower end of sliding door 4 can reliably make intimate contact with plate member 34.

Modification 1

Modification 1 is described below. In the following Modification 1, points different from those of the above-described embodiment are mainly described. Note that Modification 1 is different from the embodiment described above only in the shape of the packing.

Figure 5A:
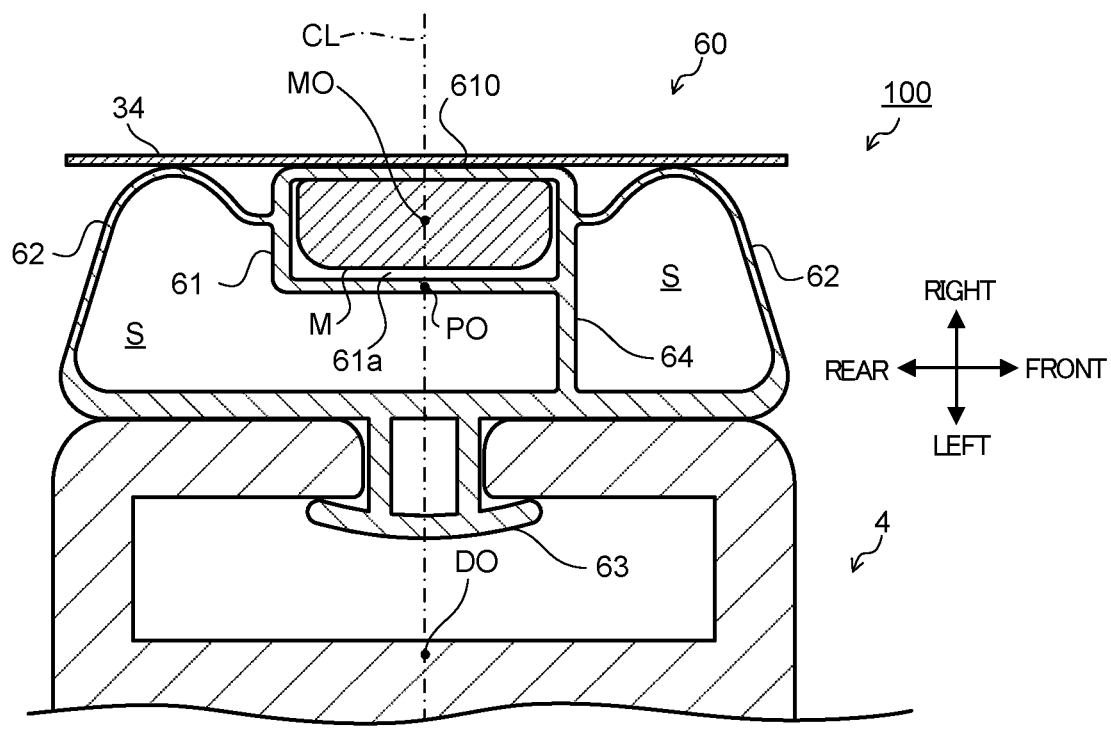
FIG. 5A is a cross-sectional view of a packing according to Modification 1.

FIG. 5A is a cross-sectional view of packing 60 according to Modification 1 taken along a horizontal plane. Packing 60 includes holding part 61 where insertion space 61a is formed, sealing part 62, attaching part 63, and connecting part 64. Sealing part 62 and attaching part 63 have configurations and functions similar to those of sealing part 52 and attaching part 53 of the above-described embodiment.

Vertical frame side portion 610 does not have a protrusion, and therefore when sliding door 4 is at the fully closed position, the entirety of the surface of vertical frame side portion 610 on the closing direction side is in intimate contact with plate member 34. In addition, sealing part 62 is in intimate contact with plate member 34 both on the outside and the inside of sealing part 62. In addition, since magnet M and plate member 34 are parallel to each other, there is no substantial difference between the distance from the portion of magnet M on the outside to plate member 34, and the distance from the portion of magnet M on the inside to plate member 34.

As with connecting part 54, connecting part 64 is provided between magnet M and attaching part 63, and connecting part 64 connects the portions on the outside of holding part 61 and attaching part 63. The difference from connecting part 54 is that the cross-sectional shape of connecting part 64 taken along the horizontal plane is a straight line.

Next, an operation of sealing structure 100 of the refrigerator including packing 60 is described. Note that unless otherwise noted, the operation of packing 60 is the same as the operation of packing 50 of the embodiment.

When sliding door 4 is at the fully closed position, vertical frame side portion 610 is in intimate contact with plate member 34 as described above.

When sliding door 4 at the fully closed position moves in the opening direction, the portion of holding part 51 on the outside is pulled in the opening direction by connecting part 64, and sealing part 62 on the outside and the outer end part of vertical frame side portion 610 move away from plate member 34. That is, the distance between the portion of magnet M on the outside and plate member 34 is increased at a timing earlier than the distance between the portion of magnet M on the inside and plate member 34. That is, magnet M is tilted with respect to plate member 34.

Further, when sliding door 4 moves in the opening direction, holding part 61 is pulled in the opening direction by connecting part 64, and sealing part 62 is also pulled by attaching part 63. In this manner, the inner end part of vertical frame side portion 610 and sealing part 62 on the inside move away from plate member 34, and refrigeration compartment R is changed from the sealed state to the open state. When refrigeration compartment R is brought into an open state, packing 60 is returned to a natural state from an elastically deformed state.

As described above, it suffices that the cross-sectional shape of the packing is asymmetric between the inside of refrigeration compartment R and the outside of refrigeration compartment R, and therefore a connecting part with a straight line shape may be provided outside packing 60 as with packing 60 of Modification 1. In Modification 1, as in the embodiment, sliding door 4 can be moved in the opening direction from the fully closed position with a smaller force. In addition, with sealing part 62, the adhesion of refrigeration compartment R when sliding door 4 is in the fully closed state can be increased.

According to Modification 1, the following effects can be provided in addition to effects similar to those of the above-described embodiment.

Vertical frame side portion 610 does not have a protrusion, and therefore a wider area of the intimate contact between vertical frame side portion 610 and plate member 34 can be ensured when sliding door 4 is at the fully closed position in comparison with packing 50 of the embodiment. Therefore, as in the above-described embodiment, packing 60 provides a higher sealing of refrigeration compartment R in comparison with packing 50 that makes intimate contact with plate member 34 only at two portions, the end part of the inside or outside and the protrusion, of vertical frame side portion 610.

Note that packing 60 may include only one of sealing part 62 on the inside and sealing part 62 on the outside.

Modification 2

Modification 2 is described below. In Modification 2, points different from the above-described embodiment and Modification 1 are mainly described. Note that Modification 2 is different from the embodiment described above only in the shape of the packing.

Figure 5B:
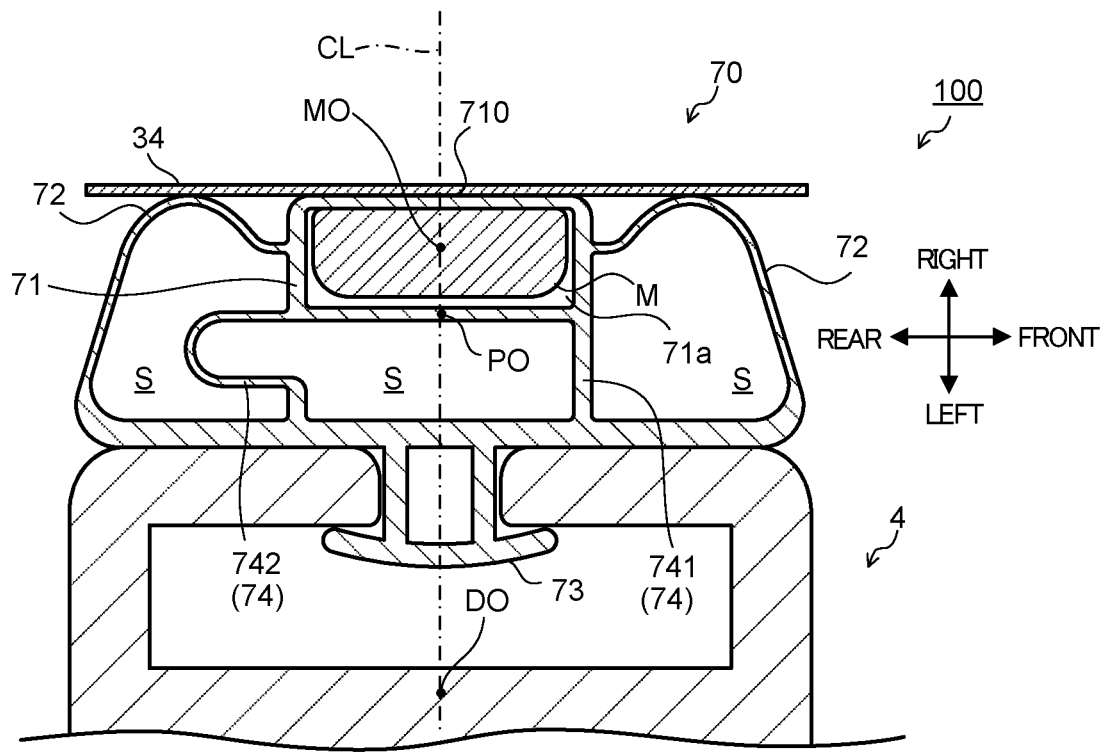
FIG. 5B is a cross-sectional view of a packing according to Modification 2.

FIG. 5B is a cross-sectional view of packing 70 according to Modification 2 taken along a horizontal plane. Packing 70 includes holding part 71 in which insertion space 71a is formed, sealing part 72, attaching part 73, and connecting part 74. Sealing part 72 and attaching part 73 have functions similar to those of sealing part 52 and attaching part 53 of the above-described embodiment. Holding part 71 has a configuration and a function similar to those of holding part 61 of Modification 1.

Connecting part 74 includes straight line shape connecting part 741 and deflective shape connecting part 742.

Straight line shape connecting part 741 has a configuration and a function similar to those of the above-described connecting part 64 of Modification 1. Deflective shape connecting part 742 connects the portions on the inside of holding part 71 and attaching part 73. The cross-sectional shape of deflective shape connecting part 742 is a U-shape protruding inward. Other configurations of deflective shape connecting part 742 are similar to those of connecting part 54 of the above-described embodiment.

Next, an operation of sealing structure 100 of the refrigerator including packing 70 is described. Note that unless otherwise noted, the operation of packing 70 is the same as the operation of packing 60 of Modification 1.

When sliding door 4 is at the fully closed position, both outside and inside of sealing part 72 and vertical frame side portion 710 are in intimate contact with plate member 34. At this time, magnet M and plate member 34 are parallel to each other.

When sliding door 4 at the fully closed position moves in the opening direction, the portion on the outside of holding part 71 is pulled in the opening direction by straight line shape connecting part 741. In addition, the portion of holding part 51 on the inside is pulled in the opening direction by deflective shape connecting part 742. However, straight line shape connecting part 741 is less elastically deformed in the opening closing direction than deflective shape connecting part 742, and therefore the force in the opening direction that acts on holding part 71 from straight line shape connecting part 741 is greater than the force in the opening direction that acts on holding part 71 from deflective shape connecting part 742. Accordingly, the outer end part of vertical frame side portion 710 moves away from plate member 34 at an earlier timing than the inner end part. Specifically, the distance between the portion of magnet M on the outside and plate member 34 is increased at an earlier timing than the distance between the portion of magnet M on the inside and plate member 34.

Further, when sliding door 4 moves in the opening direction, holding part 71 is pulled in the opening direction by deflective shape connecting part 742, the inner end part of vertical frame side portion 710 also moves away from plate member 34, and refrigeration compartment R is changed from the sealed state to the open state. When refrigeration compartment R is brought into an open state, packing 70 is returned to a natural state from an elastically deformed state.

As described above, it suffices that the cross-sectional shape of the packing is asymmetric between the inside of refrigeration compartment R and the outside of refrigeration compartment R, and therefore connecting parts with different shapes may be provided on the outside and the inside of packing 70 as with packing 70 of Modification 2. According to Modification 2, sliding door 4 can be moved in the opening direction from the fully closed position with a smaller force as in the embodiment.

According to Modification 2, the following effects can be provided in addition to effects similar to those of the effects of the above-described Modification 1.

Since packing 70 includes straight line shape connecting part 741 and deflective shape connecting part 742, a larger number of heat insulating spaces S are formed in packing 70 in comparison with the packings of embodiment and Modification 1. Thus, packing 70 can provide a higher heat insulating property of refrigeration compartment R in comparison with packing 50 and packing 60.

Note that the packing may not include the connecting part since it suffices that the portion on the outside and the portion on the inside have asymmetric shapes. For example, the packing may be formed such that the outside and the inside of sealing part have different thicknesses.

Furthermore, it suffices that the deformability in the opening closing direction is different between the outside and the inside in the packing. Therefore, the packing may have a shape that is symmetric between the outside and the inside. For example, the portion on the outside and the portion on the inside of the packing may be formed using materials with different elasticity coefficients.

Note that the packing need not necessarily be configured such that one of the distance from the portion of magnet M on the inside to plate member 34 and the distance from the portion of magnet M on the outside to plate member 34 is increased at an earlier timing than the other. For example, in the case where the packing is formed such that it becomes more elastically deformable in the opening closing direction of sliding door 4 as it goes toward the lower end, the distance between the upper end side portion of magnet M and plate member 34 is increased at an earlier timing than the distance between the lower end side portion of magnet M and plate member 34 when sliding door 4 moves in the opening direction. Thus, even in the case where the packing is formed such that the elastic deformability of sliding door 4 in the opening direction is different between the upper end side portion and the lower end side portion of the packing, sliding door 4 can be moved in the opening direction from the fully closed position with a smaller force as in the above-described embodiment.

In addition, when sliding door 4 is at the fully closed position, magnet M may make direct contact with plate member 34. Note that packings 50, 60 and 70 include sealing parts 52, 62 and 72, respectively, that make intimate contact with plate member 34 when sliding door 4 is at the fully closed position. Therefore, packings 50, 60 and 70 can ensure the sealing property of refrigeration compartment R even when vertical frame side portions 510, 610 and 710 are not provided.

While the packing attached to sliding door 4 is described in the above-described embodiment, Modification 1 and Modification 2, the packing attached to sliding door 5 has a similar configuration and provides similar operational effects.

In addition, plate member 34 may be provided on the end parts on the closing direction side of sliding doors 4 and 5, i.e., the sashes, and the packing may be attached at a position facing plate member 34 in frame body 3. In this case, elongated member 30 is composed of the sash and plate member 34.

Further, refrigerator 1 may be provided with drawer doors and opening doors in place of sliding doors 4 and 5.

This application is a continuation of International Patent Application No. PCT/JP2020/030914, filed on Aug. 14, 2020, the disclosure of which is incorporated herein by reference in its entirety. International Patent Application No. PCT/JP2020/030914 is entitled to (or claims) the benefit of Japanese Patent Application No. 2019-154911, filed on Aug. 27, 2019 the disclosure of which is incorporated herein by reference in its entirety.

INDUSTRIAL APPLICABILITY

The sealing structure of the refrigerator according to the present disclosure is applicable to a door of a refrigerator for storing drugs. Therefore, its industrial applicability is very wide.

REFERENCE SIGNS LIST

1 Refrigerator
2 Housing

3 Frame body
4, 5 Sliding door
6 Machine housing compartment
30 Elongated member
32 Lower frame
33 Vertical frame
34 Plate member
41 Sash
41a Attached part
42 Glass layer
43 Handle
50, 60, 70 Packing
51, 61, 71 Holding part
51a, 61a, 71a Insertion space
510, 610, 710 Vertical frame side portion
511 Protrusion
52, 62, 72 Sealing part
53, 63, 73 Attaching part
54, 64, 74 Connecting part
741 Straight line shape connecting part
742 Deflective shape connecting part
100 Sealing structure
R Refrigeration compartment
M Magnet
IM Heat insulation material
CL Line

The invention claimed is:

1. A sealing structure for a refrigerator including a refrigeration compartment, comprising:
   an elongated member including a magnetic part including a magnetic material;
   a magnet configured to be mutually attracted with the magnetic part; and
   a packing including a holding part configured to hold the magnet, and a sealing part configured to make intimate contact with the elongated member when the refrigeration compartment is sealed, wherein:
   the holding part includes a frame side surface located between the magnet and the elongated member and facing the elongated member and a protrusion disposed in the frame side surface, and
   the frame side surface and the magnet are tilted with respect to the elongated member when the refrigeration compartment is sealed such that, when the packing is being separated from the elongated member, a distance between a part of the magnet and the elongated member becomes larger at an earlier timing than a distance between another part of the magnet and the elongated member.

2. The sealing structure of the refrigerator according to claim 1, wherein the protrusion and a part of the frame side surface other than the protrusion are configured to make intimate contact with the elongated member when the refrigeration compartment is sealed.

3. The sealing structure of the refrigerator according to claim 1, wherein the packing has a cross-sectional shape that is asymmetric with respect to a line perpendicular to the elongated member and passing a center of the magnet.

4. The sealing structure of the refrigerator according to claim 3, wherein the packing further includes:
   an attaching part configured to be attached to an attaching object; and
   a connecting part provided between the magnet and the attaching part and configured to connect the attaching part and the holding part.

5. The sealing structure of the refrigerator according to claim 4, wherein the connecting part has a deflected shape.

6. The sealing structure of the refrigerator according to claim 4,
   wherein the attaching object is a sliding door; and
   wherein a center of the magnet in a thickness direction of the sliding door is located on a line that passes through a center of the sliding door in the thickness direction and is parallel to a movement direction of the sliding door.

7. A refrigerator comprising the sealing structure of the refrigerator according to claim 1.

8. The refrigerator according to claim 7, further comprising:
   a frame body; and
   a sliding door disposed at the frame body,
   wherein the packing is provided at the sliding door, and
   wherein the elongated member is provided at the frame body.

* * * * *